US006191914B1

(12) United States Patent
Challener et al.

(10) Patent No.: US 6,191,914 B1
(45) Date of Patent: Feb. 20, 2001

(54) COMPACT MEDIA DRIVE HAVING RETRACTABLE MEDIA SUPPORT

(75) Inventors: David C. Challener, Raleigh, NC (US); John P. Karidis, Ossining, NY (US); Charles E. Kuhlmann, Youngsville, NC (US)

(73) Assignee: International Business Machines Corporation, Armonk, NY (US)

( * ) Notice: Under 35 U.S.C. 154(b), the term of this patent shall be extended for 0 days.

(21) Appl. No.: 09/282,718

(22) Filed: Mar. 31, 1999

(51) Int. Cl.[7] .............................. G11B 17/04; G11B 33/02
(52) U.S. Cl. ......................................... 360/99.08; 369/77.2
(58) Field of Search ........................ 360/99.06; 369/75.1, 369/75.2, 77.1, 77.2

(56) References Cited

U.S. PATENT DOCUMENTS 5,577,014 * 11/1996 Kawamura ............................ 369/77.2
5,737,293 * 4/1998 Kawamura et al. ................. 369/77.1

* cited by examiner

Primary Examiner—George J. Letscher
(74) Attorney, Agent, or Firm—George E. Grosser

(57) ABSTRACT

A compact media drive for use in personal computers has a media support and detector arm structure that ejects to extend external of the drive case at the insertion slot to receive corners of a unit of media during data operations. The arm(s) retract within the drive case or system case when no media is received. This allows a drive case to be proportioned with a drive hub for the media adjacent to the insertion slot to reduce the dimension there between from that for normal full disk insertion. The arm structure permits the drive to collect state information at the rear disk corners necessary to avoid incorrect data operations while a significant portion of the disk remains outside the insertion slot.

7 Claims, 6 Drawing Sheets

COMPACT MEDIA DRIVE HAVING RETRACTABLE MEDIA SUPPORT

BACKGROUND OF THE INVENTION

1. Field of the Invention

The invention relates, in general, to the field of media drives for a personal computer and, in particular, to media drives designed to occupy a small volume of space in a computer.

2. Discussion of the Art

Reduction of size is a major objective in the design of components for personal computers. Floppy drives today require far less room than their predecessors when the first personal computers were announced. Nonetheless, pressures continue, particularly for portable computers, to reduce size. Indeed, many portable computers have bays which receive switchable drives (e.g. a battery or a hard drive or a floppy drive may use the same bay) or provide external drives removably connected by a cord to reduce the size and awkwardness of the basic computer package. Switching or externally connecting drives is, however, an inconvenience and increases the possibility that the drive is not with the computer at the desired time. Reducing drive size has become increasingly challenging because certain media form factors such as those for the three and a half inch floppy disk and the Zip® disk have become standards and drives must accommodate those media packages to satisfy customers.

SUMMARY of the INVENTION

The invention involves a recognition that there are four information areas or zones on a standard media disk that need to be engaged to properly store data or write data. Toward one end (forward) of the rectangular disk are a media access window and an angled corner of the cover (orientation key). Two indicator perforation sites at the opposite end (rear) corners of the cover complete the needed access. By providing retractable arms to detect the state of the perforation sites it is possible to reliably perform data operations on the disk and yet leave the rear of the disk extending outside the drive enclosure. This permits a shortened drive enclosure in one dimension of the disk.

Preferably the arms are extended by an interaction with the disk, as it is inserted, to position state sensing detectors on the arms at the perforation sites. Known head mechanisms interact at the media window to drive window cover to a read/write position and move reading heads into place. An angled barrier rib interacts with the forward right corner of the disk to block insertion if the disk is in an incorrect orientation. By so arranging and configuring the drive, the hub of the disk media may be driven by a driver member positioned adjacent to the insertion slot, eliminating the space usually expended for accommodating the disk portion extending from the hub to the rear of the disk cover. While efforts have been made in the prior art to reduce drive size by partial insertion of the disk they have typically relied on the user to check for media type, protection and/or orientation.

BRIEF DESCRIPTION OF THE DRAWINGS

Preferred implementations for the invention will be described in detail with reference to the drawings wherein.

DESCRIPTION OF PREFERRED EMBODIMENTS

Figure 1:
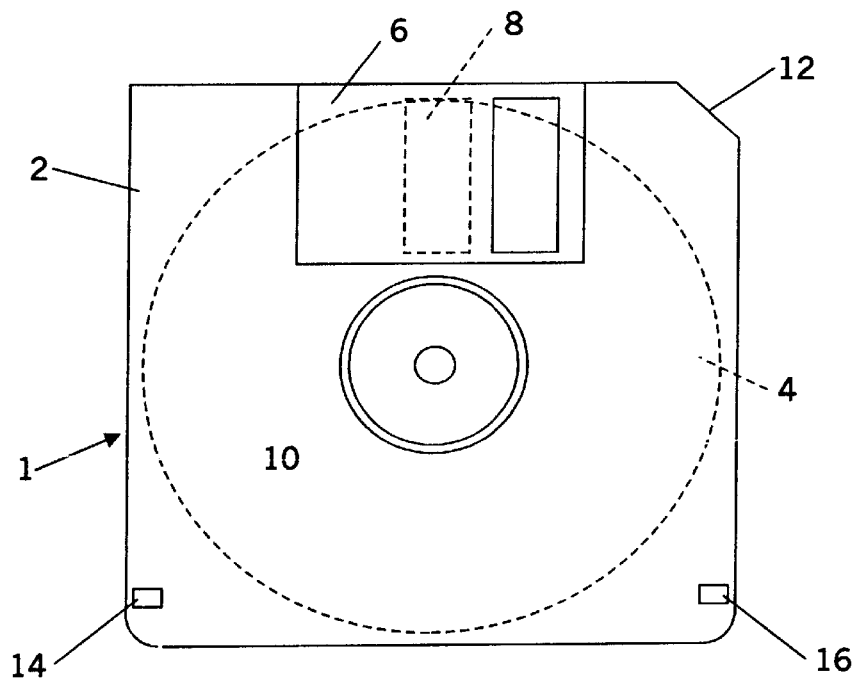
FIG. 1 is a top plan view of a preferred disk drive according to the invention with a disk inserted.

Referring to FIG. 1 a standard media disk 1 of a type suitable for the invention includes a cover 2 enclosing the disk-shaped media 4, a forward-located, spring- loaded slide cover 6 for a window 8 which allows access for reading and writing to the media and a central media hub 10 for rotating the media. The cover 2 includes a forward located angled corner 12 which serves as an orientation key and perforation zones 14 and 16 which indicate respective states for the media according to their open or closed state, all as is well known in the art.

Figure 2:
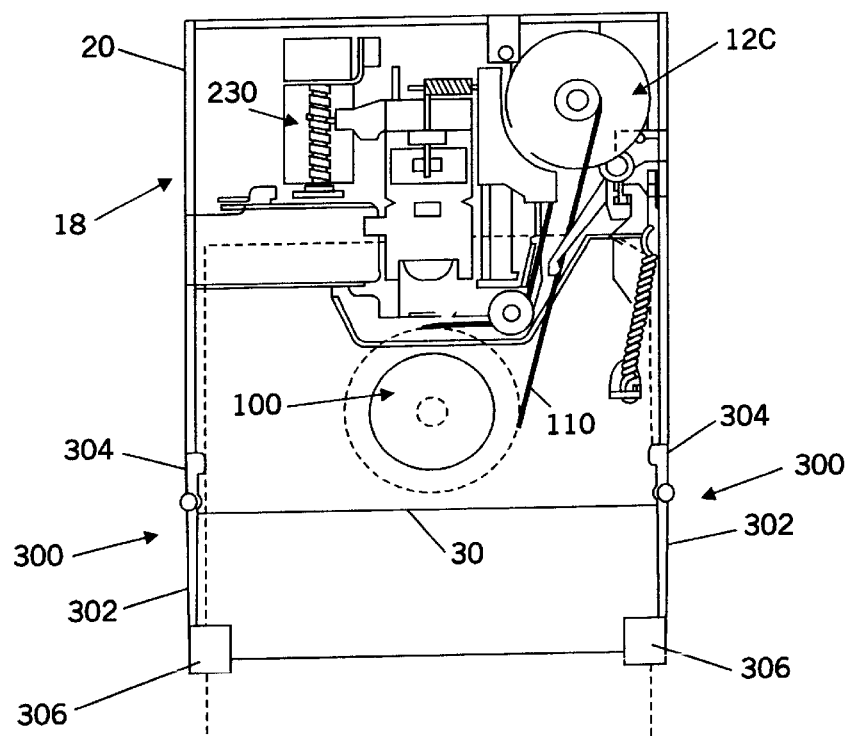
FIG. 2 is a top plan view of a drive adapted for detector arms according to one implementation for the invention.

Considering now FIG. 2, a disk media drive 18 has an outer cover 20 which at the front thereof defines a slot opening 30 for receiving a disk 40 (shown in phantom). The drive includes a drive hub 100 for engaging and rotating and inserted disk 30 which hub is driven by a belt 110 driven by a motor 120. According to the invention the drive hub 100 is mounted adjacent to the insertion slot 30 and an inserted disk is blocked from further entry by a barrier projection 130 which aligns the drive hub and media hub for driving engagement or if the disk is improperly oriented blocks full entry.

A pawl mechanism 200 moves the slide cover 6 to an open position exposing the media 4 for read/write operations when the disk 1 is fully inserted. A head carriage 220 engages the media 4 at window 8 and is driven by worm gear mechanism 230. Engagement of the media 4 by the head carriage 220 is controlled by carrier plate 240. The structure for reading and writing the disk is known in the art for example by U.S. Pat. No. 5,396,385 entitled "Floppy Disk Drive" which is hereby incorporated by reference.

Figure 8A:
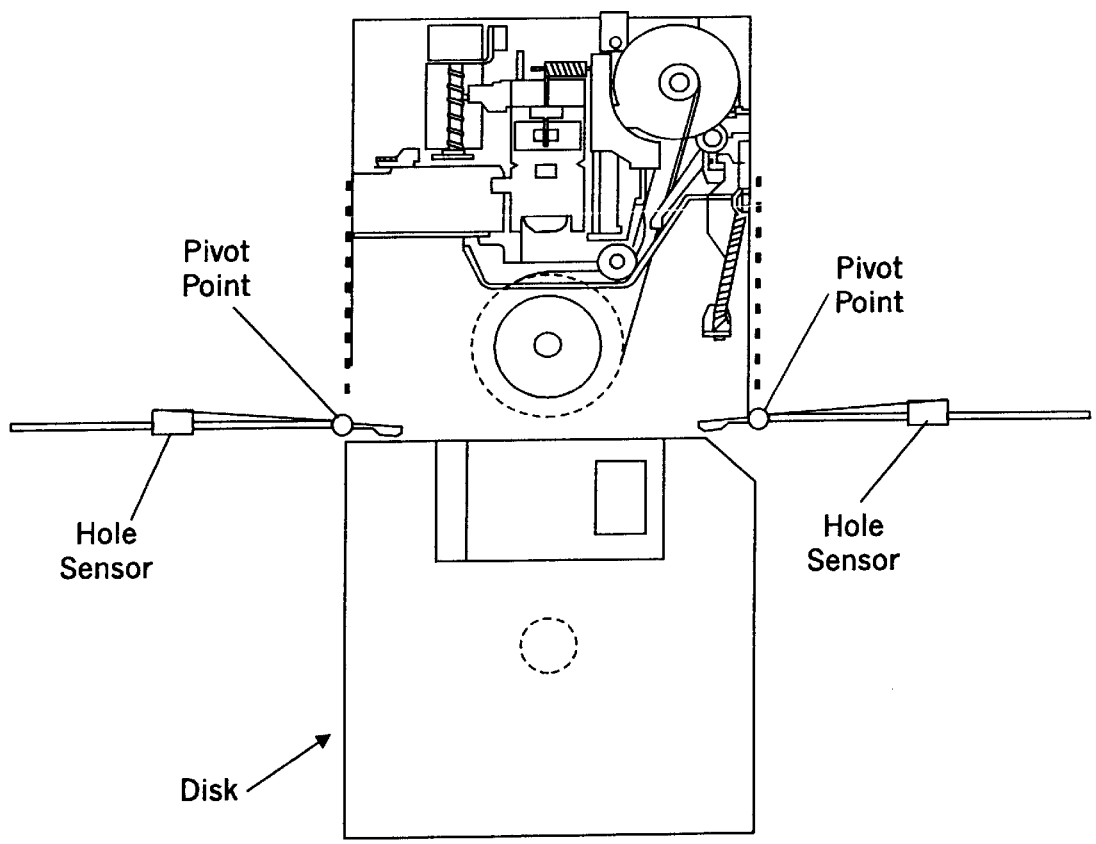
FIGS. 8a, b and c are simplified diagrammatic views showing detector arms according to a preferred implementation for the invention at three conditions of disk insertion.
Figure 8B:
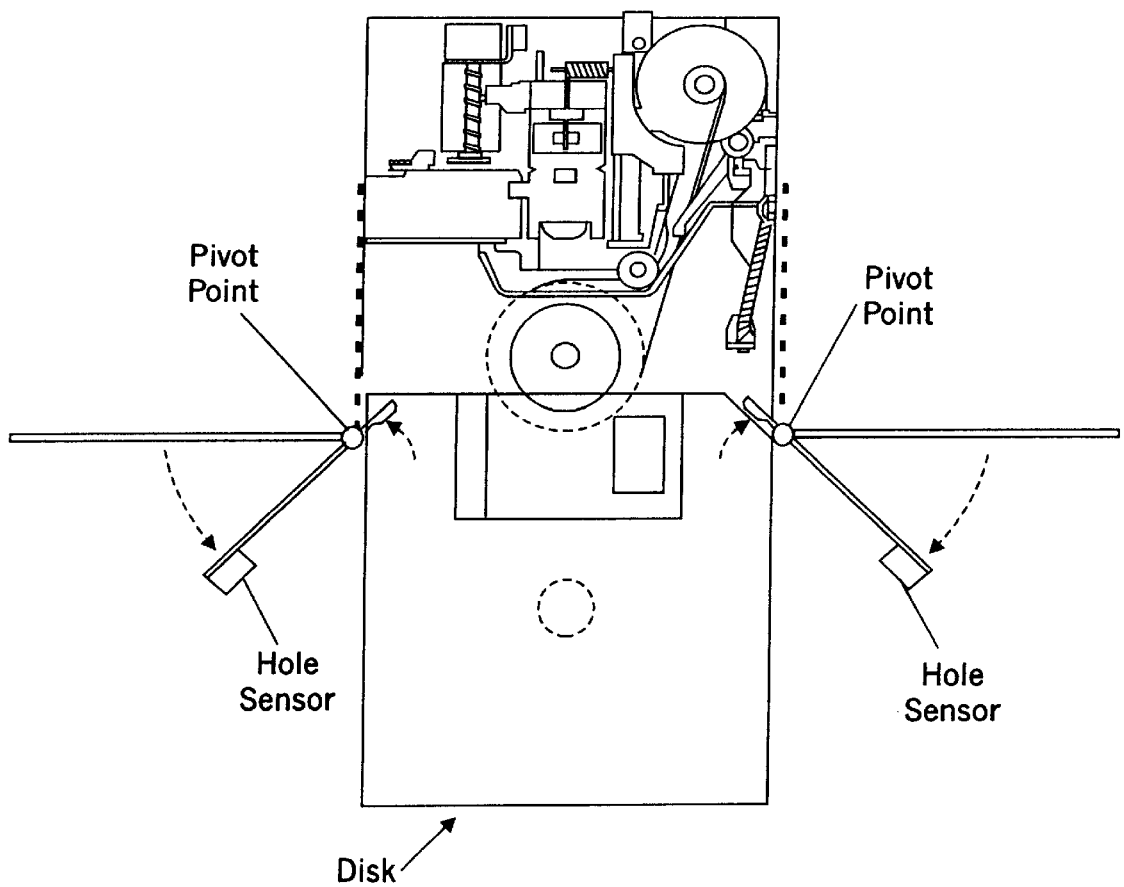
Figure 8C:
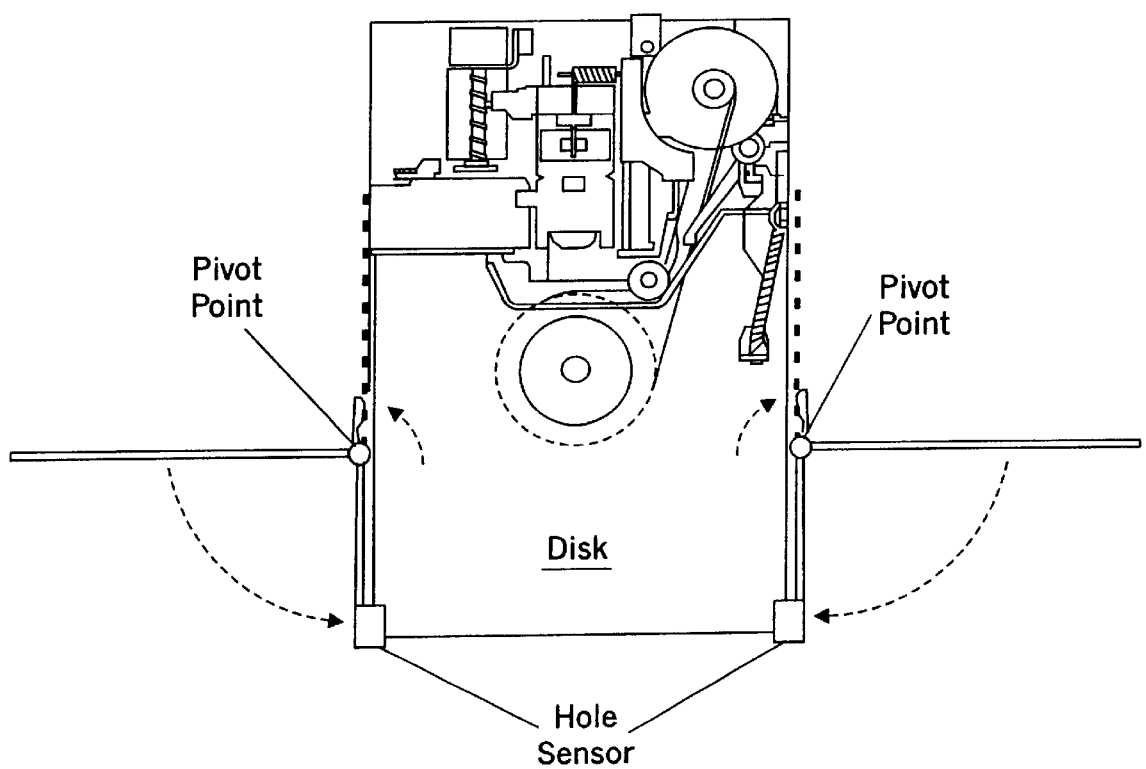

The sensor arms 300 are pivoted at the insertion slot 30 and are spring biased to the position shown in FIG. 8a. The arms include a sensor portion 302 and a cam portion 304.

Figure 3:
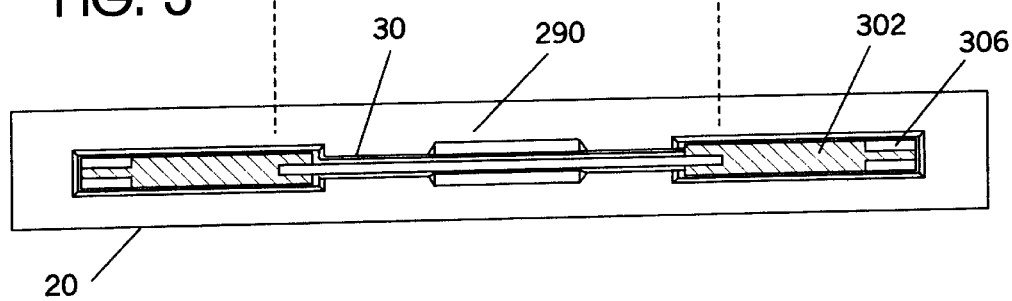
FIG. 3 is a front elevational view of a front bezel adapted for detector arms according to one implementation for the invention.
Figure 4:
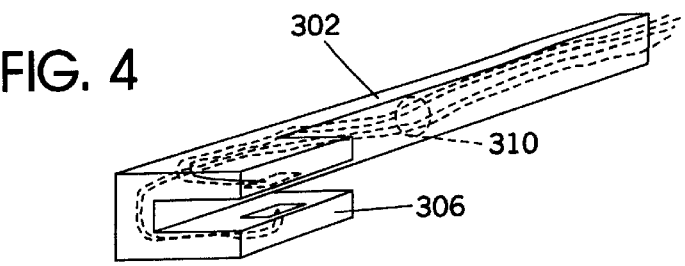
FIG. 4 is a top perspective view of a left pivot arm for use in supporting and detecting disks according to a preferred implementation for the invention.

Referring to FIG. 3 the bezel 290 is adapted to accommodate the sensor arms 300. FIG. 4 shows the sensor portion 30 with optical sensors 308 arranged on a sensor cage 306.

Figure 7:
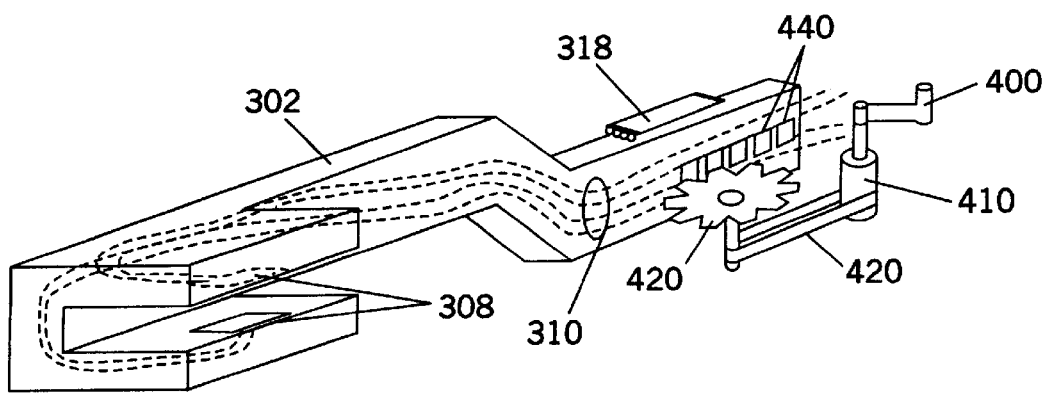
FIG. 7 is a top perspective view of a crank driven arrangement for detector arms according to the second implementation for the invention.
Figure 5:
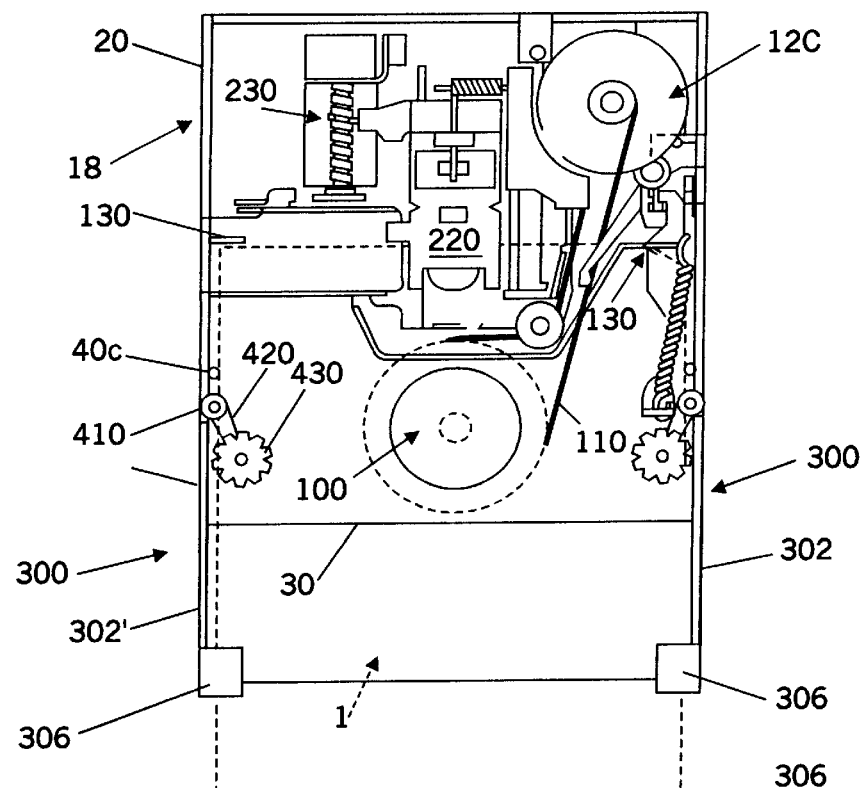
FIG. 5 is a top plan view of a drive adapted for detector arms according to second implementation for the invention.
Figure 6:
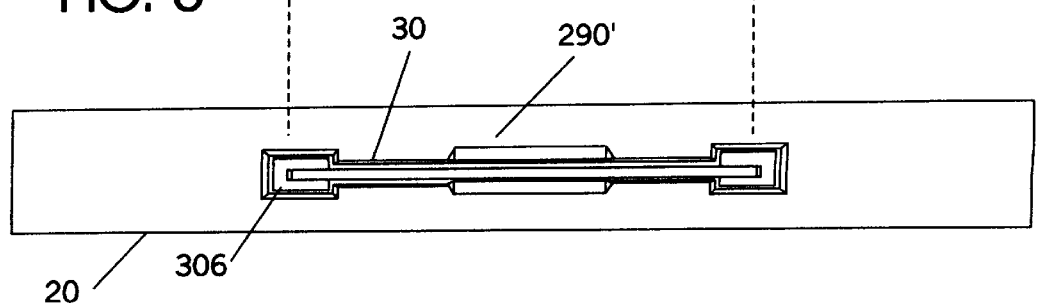
FIG. 6 is a front elevational view of a front bezel adapted for detector arms according to the second implementation for the invention

At FIG. 5 a version of the invention using a crank arm 400 to drive a belt 420 to inturn drive a gear 430 coacting with apertures 440 to advance the sensor arm 300. The sensor arm 300 is guided in track 318. The crank arm 400 is arranged to engage and be driven by the disk 1 when inserted. FIG. 6 shows a bezel 290' adapter for the crank type sensor arms 300. FIG. 7 shows detail of the crank type sensor arm arrangement.

FIGS. 8a, b and c show the cam arrangement for sensor arms for three stages of disk 1 insertion.

The invention has been described with reference to preferred embodiments thereof, but it should be appreciated that variations and modifications within the spirit and scope of the invention will be suggested to those skilled in the art and to determine the scope of the protected invention refer to the appended claims.

What is claimed is:

1. A drive for receiving a data disk having a rectangular housing, a central drive hub, a read window a predefined distance from the hub toward a forward end of the housing and state perforation zones, at the corners of a rear end of the housing opposite the forward end, and an angled corner at the front end of the housing for indicating orientation, said drive comprising:

a cover enclosure having defined therein an insertion slot for the data disk;

a hub driver positioned adjacent the insertion slot and arranged to coact with the drive hub of the inserted disk in driving engagement;

a read head positionable relative to the hub driver to engage a received disk at the read window;

a barrier projection arranged to block full insertion of the disk unless presented with said angled corner; and sensor arms coupled to a cam arranged to be displaced by insertion of the disk to be moved to an active position external of the enclosure to engage the rear end of the disk and produce state signals indicative of the state of the perforation zones.

2. A drive according to claim 1 wherein the sensor arms are pivoted at the edges of the insertion slot and have a cam end which extends internally of the case 18 to engage the disk.

3. A drive according to claim 2 wherein the ends of sensor arms opposite the cam ends have optical detectors to detect the open or closed state of the perforation zone of the disk.

4. A drive according to claim 1 wherein the sensor arms are arranged in tracks aligned on either side of disk and are coupled to a crank that is displaced by insertion of the disk to drive the arms outwardly of the cover enclosure along edges of the disk housing.

5. A drive according to claim 2 wherein the cam ends are driven by the disk to pivot the sensor arms outwardly of the case 18.

6. A drive according to claim 4 wherein the sensor arm is coupled to the crank by a belt which drives a gear that engages the sensor arm to move it along the track.

7. A drive for receiving a data disk having a rectangular housing, a central drive hub, a read window a predefined distance from the hub toward a forward end of the housing and state perforation zones, at the corners of a rear end of the housing opposite the forward end, and an angled corner at the front end of the housing for indicating orientation, said drive comprising:

a cover enclosure having defined therein an insertion slot for the data disk;

a hub driver positioned adjacent the insertion slot and arranged to coact with the drive hub of the inserted disk in driving engagement;

a read head positionable relative to the hub driver to engage a received disk at the read window;

a barrier projection arranged to block full insertion of the disk unless presented with said angled corner;

sensor arms coupled to a cam arranged to be displaced by insertion of the disk to be moved to an active position external of the enclosure to engage the rear end of the disk and produce state signals indicative of the state of the perforation zones, and wherein the sensor arms are pivoted at the edges of the insertion slot, have a cam end which extends internally of the case to engage the disk and include optical detectors to detect the open or closed state of the perforation zone of the disk.

* * * * *